United States Patent [19]
Achelpohl

[11] Patent Number: 5,106,281
[45] Date of Patent: Apr. 21, 1992

[54] APPARATUS FOR FLATTENING AND REMOVING A PLASTIC TUBULAR FILM MADE BY A BLOWMOLDING PROCESS

[75] Inventor: Fritz Achelpohl, Lengerich, Fed. Rep. of Germany

[73] Assignee: Windmoller & Holscher, Lengerich, Fed. Rep. of Germany

[21] Appl. No.: 604,645

[22] Filed: Oct. 29, 1990

[30] Foreign Application Priority Data

Nov. 6, 1989 [DE] Fed. Rep. of Germany ....... 3936923

[51] Int. Cl.⁵ ............................................. B29C 53/20
[52] U.S. Cl. ................................. 425/72.1; 425/327; 425/392
[58] Field of Search ...................... 425/72.1, 325, 327, 425/328, 392

[56] References Cited

U.S. PATENT DOCUMENTS

| | | | |
|---|---|---|---|
| 3,716,322 | 2/1973 | Kratzert | 425/392 |
| 3,768,949 | 10/1973 | Upmeier | 425/392 |
| 4,634,358 | 1/1987 | Dellbrugge | 425/392 X |
| 4,643,656 | 2/1987 | Karl | 425/327 X |
| 4,650,406 | 3/1987 | Peters | 425/72.1 |

FOREIGN PATENT DOCUMENTS 195215 9/1986 European Pat. Off. .
2156079 8/1972 Fed. Rep. of Germany .

*Primary Examiner*—Richard L. Chiesa
*Attorney, Agent, or Firm*—Fleit, Jacobson, Cohn, Price, Holman & Stern

[57] ABSTRACT

Apparatus for flattening and removing tubular plastic film has squeeze rollers, a radial arm with a deflecting roller and a shorter radial arm with a fixed turning rod. The film from the squeeze rollers passes by way of the deflecting roller and turning rod to a winder. The deflecting roller can be swung through 180 degrees while the turning rod is swung through 90 degrees. The turning rod is mounted for swinging movement in a recess in a U-shaped frame and the deflecting roller and squeeze rollers are mounted for swinging movement on one of the legs of the frame. The arrangement allows the size of the turning rod to be maximized.

6 Claims, 1 Drawing Sheet

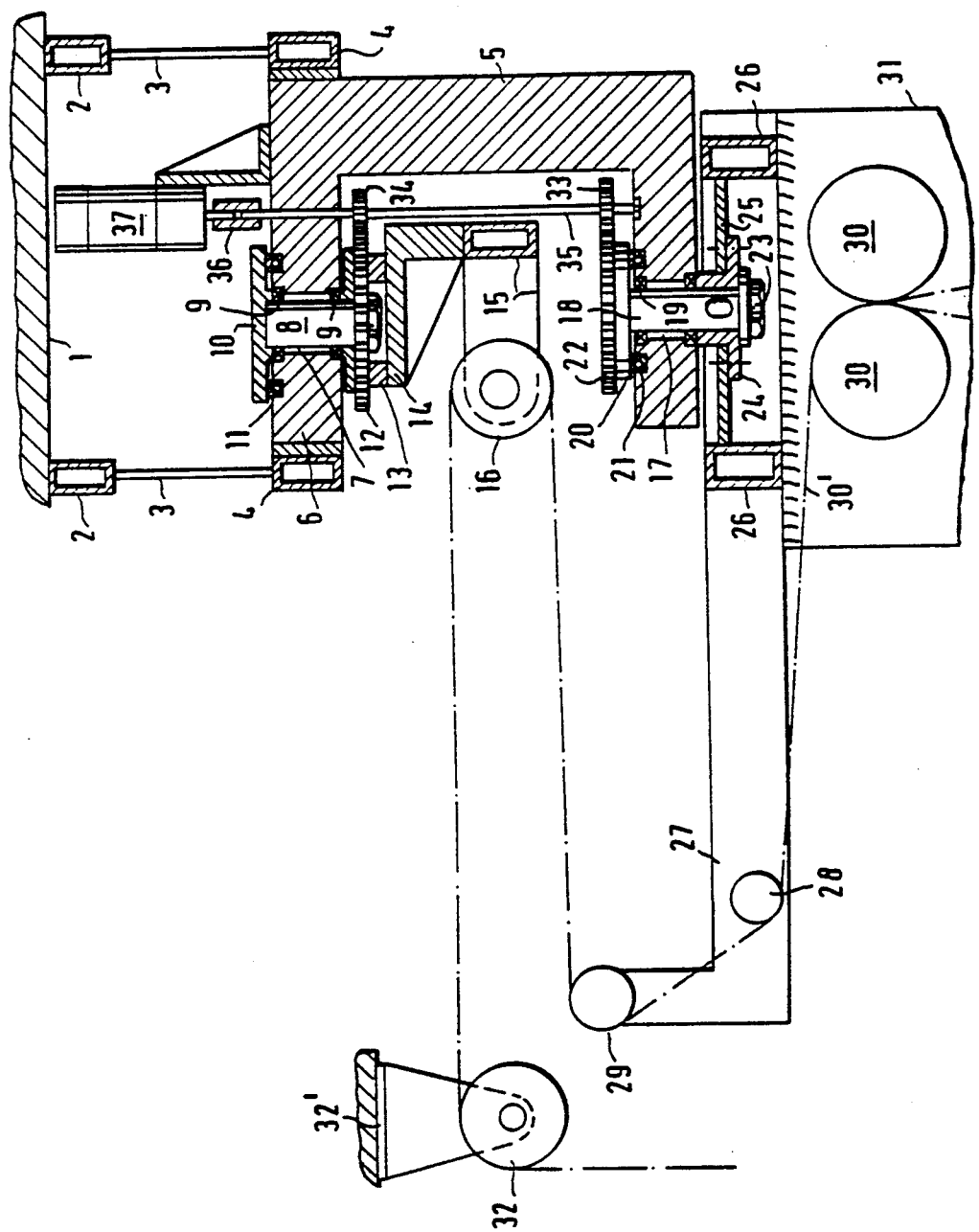

APPARATUS FOR FLATTENING AND REMOVING A PLASTIC TUBULAR FILM MADE BY A BLOWMOLDING PROCESS

BACKGROUND OF THE INVENTION

1. Field of the Invention

This invention relates to an apparatus for flattening and removing plastic tubular film made by a blowmolding process by means of a stationary film-blowing head. In such apparatus flattening plates and squeeze rollers are reversibly pivotally movable about the axis of the tubular film coming from the blowing head, and are succeeded by a stationary winding or afterprocessing means. The apparatus further comprises a radially outer turning rod, or roller which is parallel to and reversibly swingable with the squeeze rollers and a radially inner turning rod, around which the tubular film is trained between the squeeze rollers and the winding or afterprocessing apparatus. The reversible deflecting roller, the turning rod and any stationary deflecting roller extend in planes which are parallel to the plane in which the squeeze rollers can swing and the distance from the reversible deflecting roller to the swing axis is larger in any possible angular position than the distance from the film-contacting portion of the turning rod to the swing axis. The angle of the pivotal or swinging movement of the turning rod is one-half the angle of pivotal movement of the deflecting roller.

2. Description of the Prior Art

One known apparatus of the kind referred to is disclosed, for example, in U.S. Pat. No. 3,768,949.

In another apparatus of the kind referred to which is disclosed in German Patent Specification 21 56 079, the turning rod is movably mounted in holders provided on a reversibly rotatable vertical shaft, which at its bottom end carries a frame, in which the squeeze rollers and the reversible deflecting roller are rotatably mounted and the flattening plates are secured. Because the turning rod must be disposed close to the vertical shaft and the distance from the turning rod to the shaft can be altered only within close limits, the diameter of the turning rod can also be altered only within close limits so that the diameter of the turning rod cannot be increased indiscriminately although this may be desirable. For this reason the known apparatus involves a limitation of the diameter of the turning rod and the turning rod is disposed close to the vertical shaft which carries that rod so that it is difficult to train the tubular film around that turning rod as the apparatus is set up.

SUMMARY OF THE INVENTION

It is an object of the invention to provide an apparatus of the kind described in which the diameter of the turning rod can be increased substantially to any desired extent and such an increase will not obstruct and render more difficult the threading of the flattened tubular film through the apparatus as the latter is set up.

The object is accomplished in accordance with the invention in that the squeeze rollers and the reversible deflecting roller, on the one hand, and the turning rod, on the other hand, are movably mounted in a carrying frame or the like on shafts or pivots having aligned center lines, and the carrying frame is formed between the mounting means with a recess which intersects the center lines and is disposed close to the plane in which the turning rod is pivotally movable. The apparatus in accordance with the invention does not comprise a continuous shaft which carries the frame that is provided with the squeeze rollers and the reversible deflecting roller. Instead, a carrying frame is provided, which is provided on one side of the recess with means for movably mounting the subframe carrying the squeeze rollers and the reversible deflecting roller, and on the other side of the recess with a means for movably mounting a carrier in which the turning rod is held. Because the recess extends through the aligned center lines of the squeeze rollers and the turning rod, the carrying frame contains a free space in which the turning rod can perform its reverse swinging movement without obstruction by a central shaft. As a result, the diameter of the turning rod may be as large as may be practical and this will not involve disadvantages in the threading of the flattened tubular film through the apparatus as it is set up when the operation of the film-blowing head has been started.

The carrying frame is conveniently U-shaped with horizontal legs, which are vertically aligned and in which the turning rod and the unit comprising the squeeze rollers and the reversible deflecting roller are movably mounted. The carrying frame may be secured directly to the ceiling of a room or in a corresponding towerlike carrying structure.

In accordance with a further feature of the invention, the turning rod is non-rotatably mounted in pronglike carrying arms which are secured to a vertical leg or a rotatably mounted angle member, extending into the recess. The horizontal leg of the angle member which constitutes the carrier may be movably mounted by means of a vertical stub shaft in the upper portion or the upper leg of the carrying frame.

In accordance with a further feature of the invention, a drive shaft which is parallel to the center lines or pivotal axes of the stub shafts is movably mounted in the carrying frame and carries gears, which are in mesh with the gears of the carriers for the turning rod and the squeeze rollers, and the gear of the squeeze roller is driven at a speed which is twice the speed of the turning rod. A positive drive for actuating the squeeze rollers and the turning rod at properly related speeds can thus be provided in a simple manner.

BRIEF DESCRIPTION OF THE DRAWINGS

The single figure of the drawing is a side elevation of apparatus according to the invention showing partly in section a reversing mechanism in its initial position.

DETAILED DESCRIPTION OF THE PREFERRED EMBODIMENT

Cross-beams 2 are fixed by screws (not shown) to the ceiling 1 of a room.

By means of rods 3, carriers 4 are secured to the cross-beams 2. A U-shaped frame 5 is welded to the carriers 4 and has a free top leg 6, in which a pin 8 is rotatably mounted by means of bearings 9 in a bore 7 of the leg 6. The pin 8 has a collar 10, which is supported on a thrust bearing 11. A gear 12 is fixedly screwed to the pin 8 at that end thereof which is opposite to the collar 10, and a holder 14 is connected by a ring 13 to the gear 12, which is in mesh with a pinion 34. By means of holder 14, a second U-shaped frame 15 is held, which has legs with free ends in which a stationary turning rod 16 is removably mounted.

The bottom leg of the U-shaped frame 5 has a bore 17, in which a pin 18 is rotatably mounted by means of bearings 19. The pin 18 has a collar 20, which is supported on a thrust bearing 21. A gear 22 is fixedly screwed to the collar 20. At that end of the pin 18 which is opposite to the collar 20 a hub 24 provided with a collar is fixed to the pin 18 by a screw 23. A plate 25 is fixedly screwed to the hub 24 and carries a frame, which consists of two-square-section bars 26 and two profiled arms 27, which are much longer than the tubular bars 25 and have free ends in which a guide roller 28 and a guide roller 29 are rotatably mounted. Squeeze rollers 30 are rotatably mounted in two parallel plates 31, which are welded to the arms 27. The tubular film 30' which has been squeezed flat by the squeeze rollers 30 is guided by the guide roller 28, the guide roller 29, the turning rod 16 and a stationary deflecting roller 32 to a winder, not shown. The deflecting roller 32 is secured to a bracket 32'. For reversal of the apparatus, the gear 12 is in mesh with pinion 34. The two pinions 33 and 34 are splined to a shaft 35, which is rotatably mounted in the legs of the U-shaped frame 5. The shaft is connected by a clutch 36 to a drive motor 37. The gears 12 and 22 have the same number of teeth and the pinion 33 has twice as many teeth as the pinion 34, so that the angular movement imparted to the guide roller 29 during a reversing operation is twice the angular movement of the turning rod 16. The motor 37 is controlled to impart to the guide roller 29 a reversing movement through 180 degrees and to the turning rod 16 a reversing movement through 90 degrees. Because the stub shafts 8, 18, which are aligned with each other and which carry the carriers 14, 15 for the non-rotatable turning rod 16 and the frame by which the squeeze roller 30, the flattening plates and the deflecting roller 29 are carried, are axially spaced apart so that a recess is provided in the U-shaped frame 5, there is a free space for the turning rod 16 so that said turning rod may have a diameter which is as large as may be practical.

I claim:

1. An apparatus for flattening and removing plastic tubular film made by a blowmolding process in which apparatus flattening plates and squeeze rollers are reversibly pivotally movable about the axis of the tubular film, said apparatus comprising a radially outer deflecting roller parallel to and reversible with the squeeze rollers and a radially inner turning rod, around which the tubular film is trained between the squeeze rollers and an afterprocessing apparatus for feeding the tubular film to the afterprocessing apparatus, wherein said deflecting roller, and said turning rod extend in planes parallel to a plane in which the squeeze rollers are pivotally movable and a distance from the deflecting roller to said axis is larger in any possible angular position than the distance from a film-contacting portion of the turning rod to said axis, and the angle of pivotal movement of the turning rod is one-half the angle of the pivotal movement of the deflecting roller, wherein the squeeze rollers and the deflecting roller on the one hand, and the turning rod, on the other hand, are mounted in a carrying frame on respective rotary mounting means having aligned center lines and the carrying frame is formed between the mounting means with a recess having a center line which intersects the center lines of the mounting means and is disposed adjacent a plane in which the turning rod is pivotally movable.

2. An apparatus according to claim 1, wherein the carrying frame is U-shaped and has horizontal legs, which are vertically aligned and on respective ones of which the turning rod and a unit comprising the squeeze rollers and the deflecting roller are mounted.

3. An apparatus according to claim 1, wherein the turning rod is non-rotatably mounted in pronglike carrying arms which are secured to a vertical leg of a rotatably mounted angle member, said leg extending into the recess.

4. An apparatus as claimed in claim 1, wherein the turning rod and a unit comprising the squeeze rollers and the deflecting rollers have respective gears for rotating same about axes of the respective mounting means, and a drive shaft with drive pinions meshing with the respective gears is provided for reversing the turning rod through half the angle of the squeeze rollers and deflecting roller.

5. Apparatus for flattening and removing tubular plastic film made by a blowmolding process comprising squeeze rollers, a first radial arm with a deflecting roller and a second shorter radial arm with a turning rod arranged so that the film can be passed through the squeeze rollers, over the deflecting roller and turning rod to a winding means, drive means for reversibly swinging the first radial arm through a first angle while the second radial arm with the turning rod is swung through half said first angle wherein the second radial arm is mounted for swinging movement within a recess of a substantially U-shaped frame and the first radial arm is mounted for swinging movement on one leg of the frame.

6. Apparatus as claimed in claim 5 wherein the second radial arm is mounted for swinging movement on another leg of the frame.

* * * * *